United States Patent [19]

Suzuki

[11] Patent Number: 6,002,490

[45] Date of Patent: Dec. 14, 1999

[54] COLOR DIGITAL IMAGE COMPOSING APPARATUS

[75] Inventor: Hiroaki Suzuki, Ichikawa, Japan

[73] Assignee: Ricoh Company, Ltd., Tokyo, Japan

[21] Appl. No.: 08/872,548

[22] Filed: Jun. 10, 1997

Related U.S. Application Data

[63] Continuation of application No. 08/366,456, Dec. 30, 1994, abandoned.

[30] Foreign Application Priority Data

Dec. 30, 1993 [JP] Japan .................................. 5-351841

[51] Int. Cl.$^6$ ............................... H04N 1/00; H04N 1/32
[52] U.S. Cl. ...................... 358/434; 358/442; 379/100.01
[58] Field of Search ..................................... 358/400, 434, 358/435, 436, 437, 438, 439, 500, 442, 440, 468, 501, 401, 518; 379/100.01, 100.06, 100.15, 102.07, 106.01, 106.08

[56] References Cited

U.S. PATENT DOCUMENTS

| | | | |
|---|---|---|---|
| 3,940,743 | 2/1976 | Fitzgerald | 395/309 |
| 5,001,571 | 3/1991 | Murano | 358/436 |
| 5,041,917 | 8/1991 | Koshiishi | 358/436 |
| 5,189,693 | 2/1993 | Nakajima | 358/435 |
| 5,283,665 | 2/1994 | Ogata | 358/435 |
| 5,305,355 | 4/1994 | Go et al. | 375/107 |
| 5,305,456 | 4/1994 | Boitana | 395/186 |
| 5,392,133 | 2/1995 | Nakajima | 358/435 |
| 5,455,687 | 10/1995 | Fukui | 358/436 |
| 5,510,876 | 4/1996 | Hayashi | 355/202 |

*Primary Examiner*—Madeleine Nguyen
*Attorney, Agent, or Firm*—Oblon, Spivak, McClelland, Maier & Neustadt, P.C.

[57] ABSTRACT

The color digital image composing apparatus according to the present invention comprises a memory for storing therein data concerning connection between devices each constituting said apparatus and parameters specific to each device, a registration device for registering the data concerning connection between devices each constituting said apparatus and the parameters specific to each device as system parameters, and a controller for transaction of the system parameters stored in said memory prior to start of facsimile communication, so that image data most suited to capability of the receiving side can be transmitted.

4 Claims, 13 Drawing Sheets

FIG. 9

SYSTEM PARAMETERS

FILE SIZE
NAME OF MANUFACTURER
NAME OF DEVICE  ⟶ CONNECTION CONTROL DATA
NUMBER OF MANUFACTURE
YEAR, MONTH AND DATE OF MANUFACTURE
CAPACITY OF DEVICE  ex. RESOLUTION

PARAMETER FOR CORRECTION  ex. FOR COLOR CORRECTION,
                              FOR CONVERSION, LUT    ⟶ DEVICE PARAMETERS
VIRTUAL DEVICE PARAMETERS

COLOR DIGITAL IMAGE COMPOSING APPARATUS

This application is a Continuation of application Ser. No. 08/366,456, filed on Dec. 30 1994, now abandoned.

FIELD OF THE INVENTION

The present invention relates to the field of digital image equipment, and more particularly to a color digital image composing apparatus having a copy function, a facsimile function, a printer function and the like.

BACKGROUND OF THE INVENTION

In recent years, in association with reduction of a space for installation of OA equipment as well as technological advance in minimizing various types of equipment and digital image technology, digital equipment has become more and more versatile, and a color digital image composing apparatus with multiple functions including a copy function, a facsimile function and a printer function has been developed and diffused.

However, in communications between systems treating images using the facsimile functions in the conventional type of color digital image composing apparatus as described above, what functions a partner system has can not be known before a communication line is established between two systems and communication is actually started. Even if the functions of the partner system has are known, a given document can be checked only by the sending side. For this reason, how the image is actually sent can not be checked by the sending side, and for instance, whether the image is printed by an image output device in the receiving side with ink or toner can not be checked, and thus transaction of image data most suited to capability of the receiving system is not executed.

In addition, for instance, when a color digital image composing apparatus is a stand-alone system, if any abnormality occurs in an image reading device, a portion thereof and the image reading device is exchanged with a new one, there would be no problem on the condition that the new one has the completely same functions as those of the previous one, but if there are any difference in specifications between the two devices, also characteristics of the entire apparatus become different, but actually communication by the facsimile function is executed without taking the change into considerations only by modifying the image data, transaction of image subjected to best correction is not always executed.

Especially, when a color digital image composing apparatus is constructed by assembling individual devices, change of each device is, different from a stand-alone system, very easy, and it is required to know characteristics and capability of each device each time component device is exchanged, which makes it furthermore difficult to execute best correction.

SUMMARY OF THE INVENTION

It is an object of the present invention to enable transmission of image data suited to capability of a partner system in the receiving side.

In a color digital image composing apparatus according to the present invention, system parameters consisting of parameters concerning connection between devices constituting the color digital image composing apparatus and those specific to each device are registered beforehand, and the system parameters are transacted between the sending side and receiving side prior to start of facsimile communications to check capability of a system in the receiving side, thus the best correction suited to capability of the receiving system being executed.

Also when a request for system parameters is made from the sending side, the color digital image composing apparatus sends system parameters or notifies the receiving side of transmission reject code for security in the receiving side.

Other objects and features of this invention will become understood from the following description with reference to the accompanying drawings.

BRIEF DESCRIPTION OF THE DRAWINGS

FIG. 9 is an explanatory view illustrating a concrete example of a set of system parameters;

DESCRIPTION OF THE PREFERRED EMBODIMENTS

Detailed description is made hereinafter for an embodiment of the color digital image composing apparatus according to the present invention.

Figure 1:
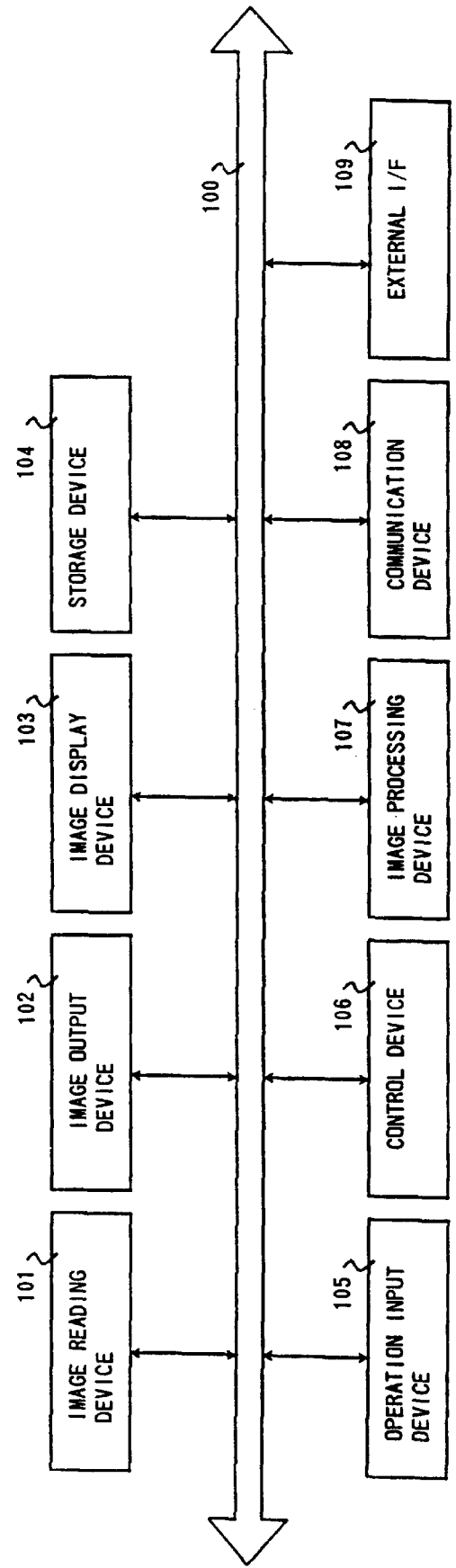
FIG. 1 is a system block diagram illustrating a color digital image composing apparatus according to the present embodiment.

FIG. 1 is a system block diagram illustrating the color digital image composing apparatus according to the present embodiment.

A color digital image composing apparatus means a system equipped with such functions as a communication function, a color facsimile facility, and a large capacity storage device in addition to functions in the conventional type of digital color image composing apparatus. A general configuration of the system shown in FIG. 1 is as described below. Connected to a system bus 100 for delivery of control signals or image data are an image reading device 101 for fetching images as digital data such as a scanner, an image output device 102 for outputting images onto recording paper such as paper or an OHP sheet such as a printer, an image display device 103 for displaying and checking images such as a monitor, a storage device 104 such as a hard disk or a photoelectric magnetic disk, an operation/input device 105 for entry of instructions for processing of parameters for setting into the apparatus or display thereon, a control device 106 for controlling each device, an image processing device 107 for processing and editing digital image data, a communication device 108 for connection to a communication network and executing such processing as coding or decoding, and an external I/F for connection with an external device such as a computer.

With the configuration as described above, next description is made for operations thereof. Herein, assuming that the color digital image composing apparatus according to the present embodiment shown in FIG. 1 is System A (in the sending side), communication with another system is examined below. Assuming that a system in the receiving side is System B, a number of different situations such as a a case where System B has the same configuration as that of a system in the sending side and is the same device as that in the sending side, a case where, although the configuration is identical, the device is different, and a case where both the configuration and device are different may occur, and a situation of a partner system can not be known before establishment of a communication line between the two systems so long as the two systems are not particular ones.

There would be a case where, although the image display device 103 in System A is a display unit having a normal degree of resolution, a RAM for display for improving the display capability is extended for connection with a high resolution display unit. When extension, removal, or change of any device as described is executed, it is necessary to register data concerning connection of each device constituting the system (called connection control data hereinafter) and data concerning the devices (device parameters) anew (hereinafter the term "system parameter" is used). The system parameter consists of connection control data and the device parameters. This setting is manually executed in initial setting or when any device is exchanged with a new one.

Figure 2:
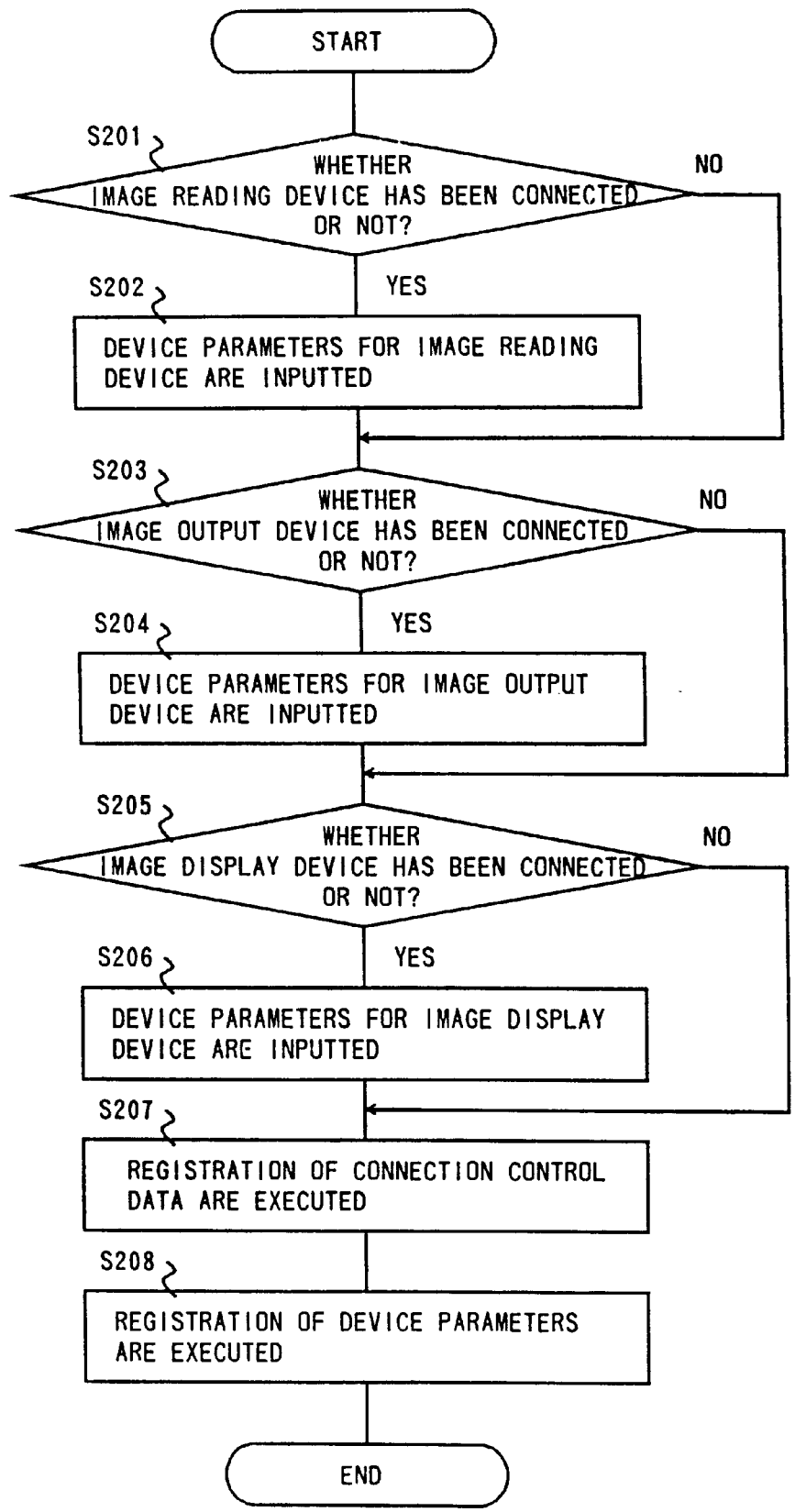
FIG. 2 is a flow chart for registration of system parameters.

FIG. 2 shows a flow chart for registration of system parameters. When registering system parameters, the system parameters are registered through the operation/input device 105 under control by the control device 106, and the registered data is stored within a memory inside the image processing device 107 (not shown herein). The section for storage may be anyone such as the storage device 104, control device 106, and image processing device 107 so long as it is within the system.

When registration of system parameters is selected through the operation/input device 105, operations according to the flow chart shown in FIG. 2 are executed by the control device 106. At first, whether the image reading device 101 has been connected or not is checked (S201), and if it is determined that the image reading device 101 has been connected, device parameters for the image reading device 101 are inputted through the operation/input device 105 (S202). Then whether the image output device 102 has been connected or not is checked (S203), and if it is determined that the image output device 102 has been connected, device parameters for the image output device 102 are inputted through the operation/input device 105 (S204). Similarly, whether the image display device 103 has been connected or not is checked (S205), and if it is determined that the image display device 103 has been connected, device parameters for the image display device 103 are inputted through the operation/input device 105 (S206). Then, according to a result of operations in steps S201 to S206, registration of connection control data (S207) and registration of device parameters (S208) are executed, then the processing is finished.

Figure 3:
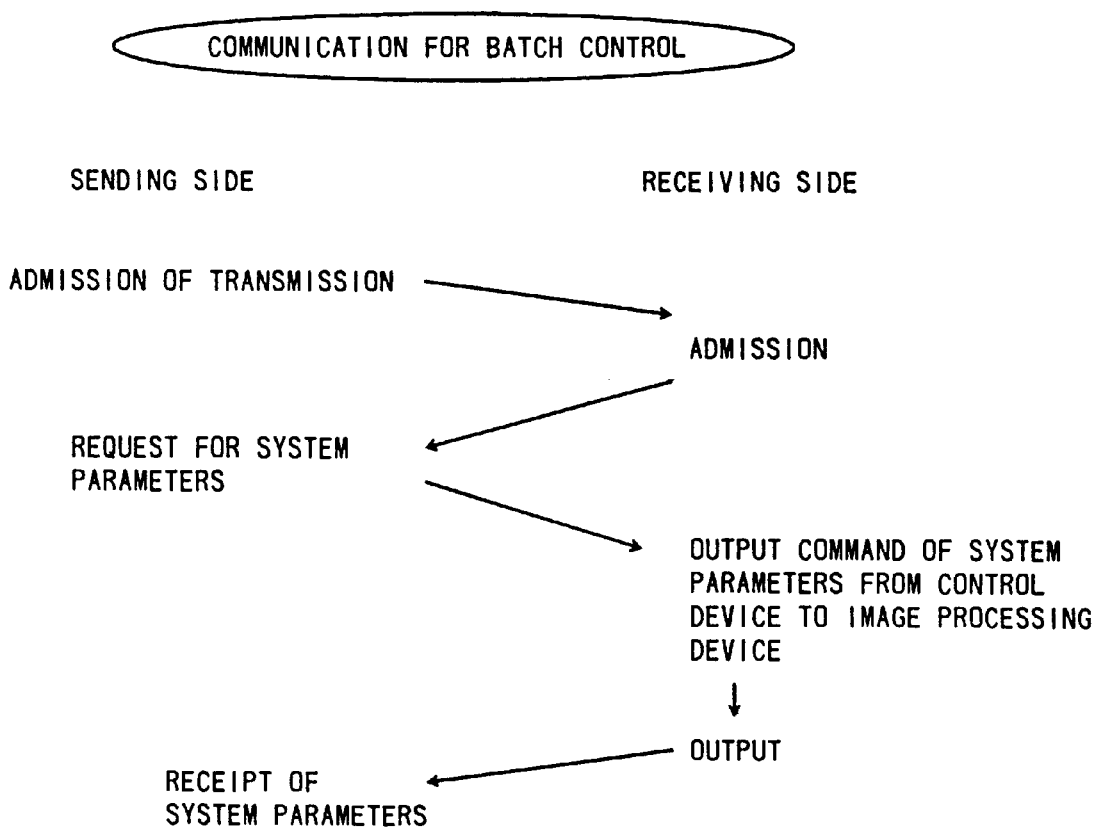
FIG. 3 is an explanatory view for explanation of system parameter transaction for batch control in the present embodiment.

Description of this embodiment assumes that registered data is controlled and stored in a batch in a memory within the image processing device 107. Then, as shown in FIG. 3, when a request for system parameters is outputted, the control device 106 in the receiving side sends system parameters stored in the image processing device 107.

Figure 4:
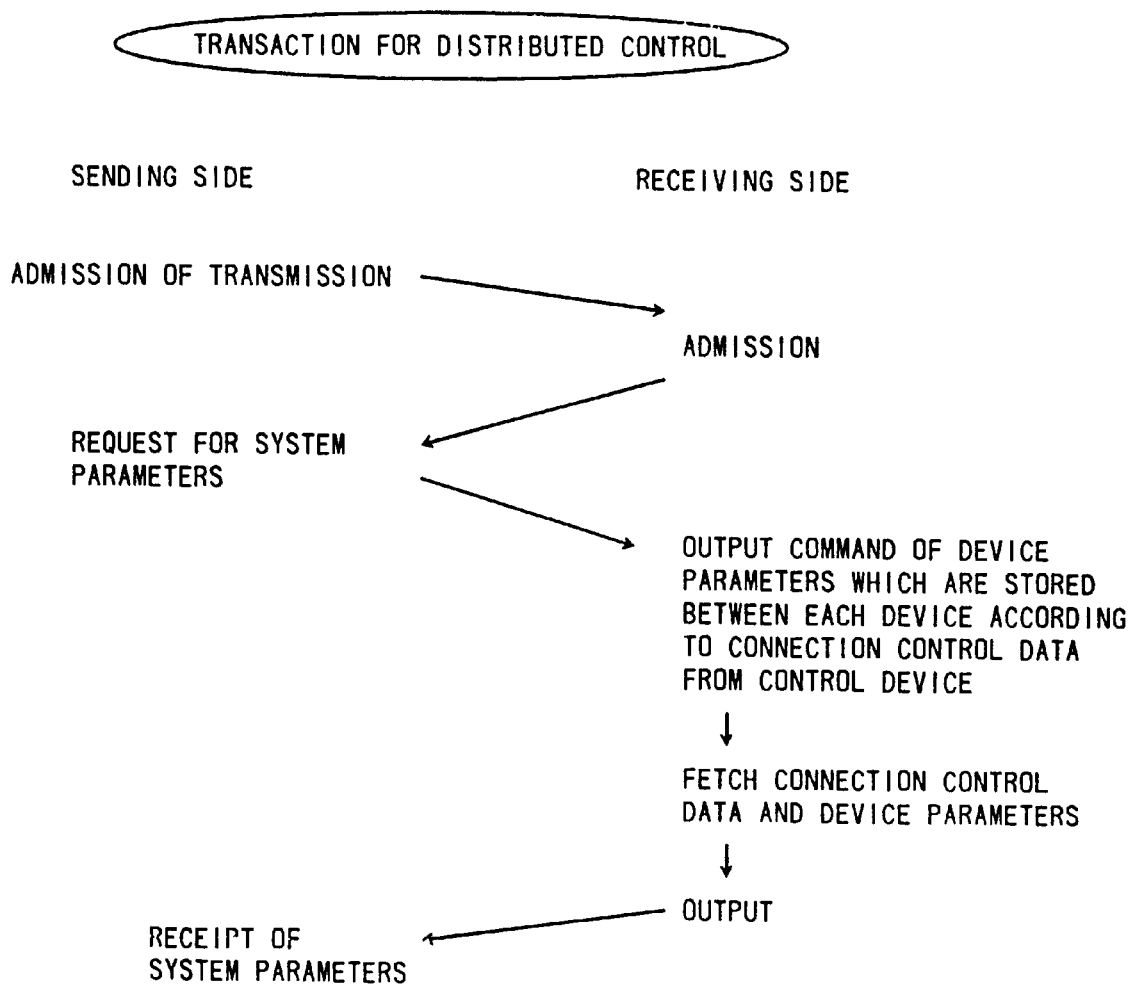
FIG. 4 is an explanatory view illustrating another example of system parameter transaction.

It should be noted that, although description of the embodiment above assumes a case where registered data is controlled and stored in batch in a memory within the image processing device 107, for instance at least data on connection control among those registered therein may be controlled in batch with other data distributed and stored in each device. When system parameters are transmitted, as shown in FIG. 4, the control device 106 fetches and sends system parameters in batch by issuing a request for output of other data to each device according to connection control data stored in the image processing device 107. Such a method as once collecting and then sending system parameters in batch as shown in FIG. 4, or sending system parameters for each device step by step is also allowable.

Also permission and rejection of transmission of device parameters allowable and not allowable respectively can be selected previously through the operation/input device 105 to a request for system parameters. With this select function, when transmission of system parameters is requested, if rejection is selected, a rejection code is generated and transmitted in place of output (response) of system parameters. For this reason, in cases where configuration or characteristics of each device owned by users, secret data produced by the device manufacturer itself because, for instance, the device is still under test, data security for the receiving side, can be protected.

Next description is made for setting a timing for registering and checking system parameters. If combination of devices in the initial stage is not changed, no problem occurs. However, if any device goes wrong and is exchanged with another one which happened to be there with the device parameters not registered, image correction is executed according to the past system, so that an appropriate image can not be obtained. For this reason, in order to grasp the current system configuration and enable processing most suited to the current system, timing for registering and checking system parameters is set, so that, for instance, the system parameters are automatically checked once for a specified period, each time communication is started, or when device connection is changed.

Figure 6:
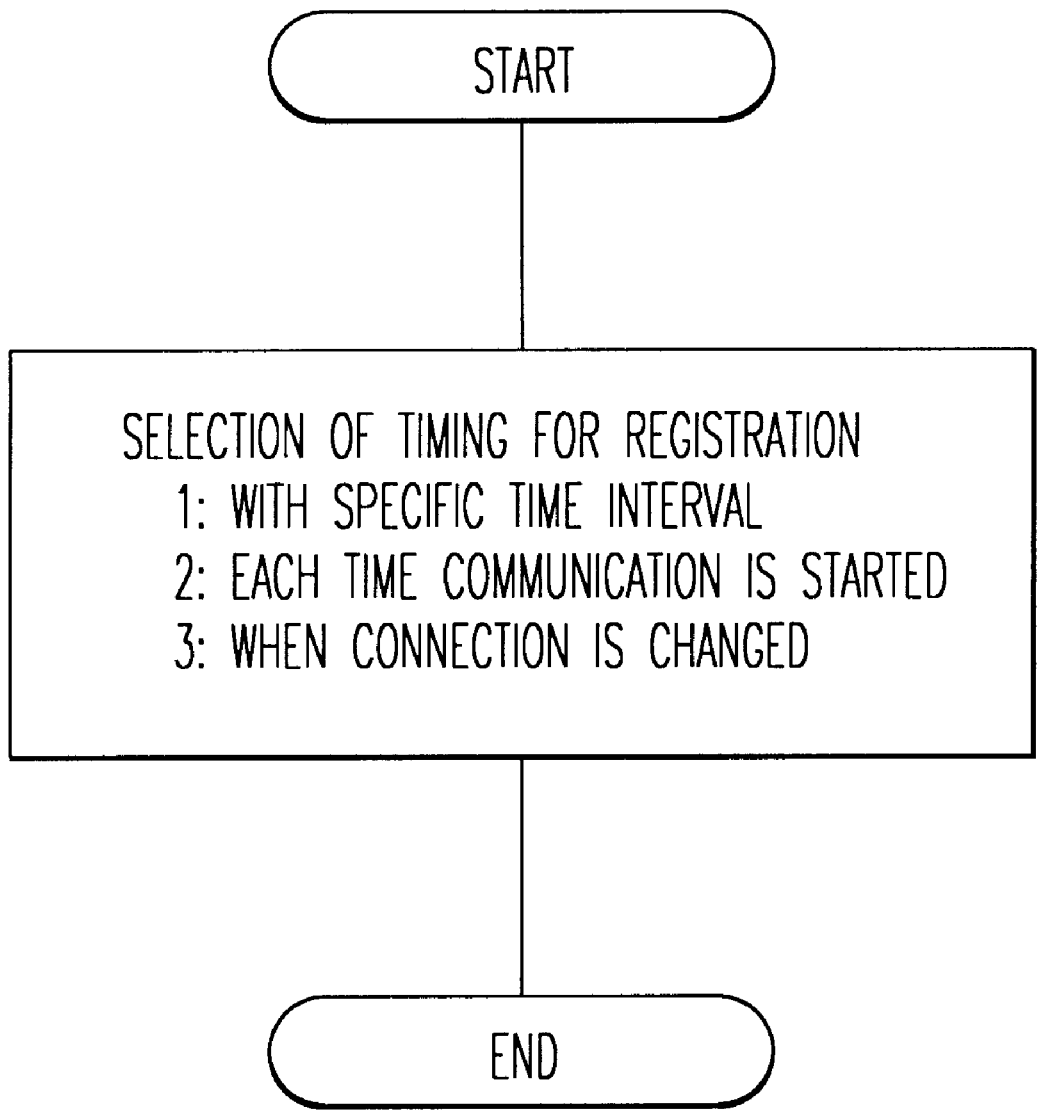
FIG. 6 is a flow chart for an operation for setting registration timing.

FIG. 6 shows a processing to set timing for registration, in which selection of timing for registration (1: With a specified time interval, 2: Each time communication is started, and 3: when connection is changed). For instance, when timing with a specified time interval is selected, the time interval is inputted to set the interval in a timer within the system.

Figure 7:
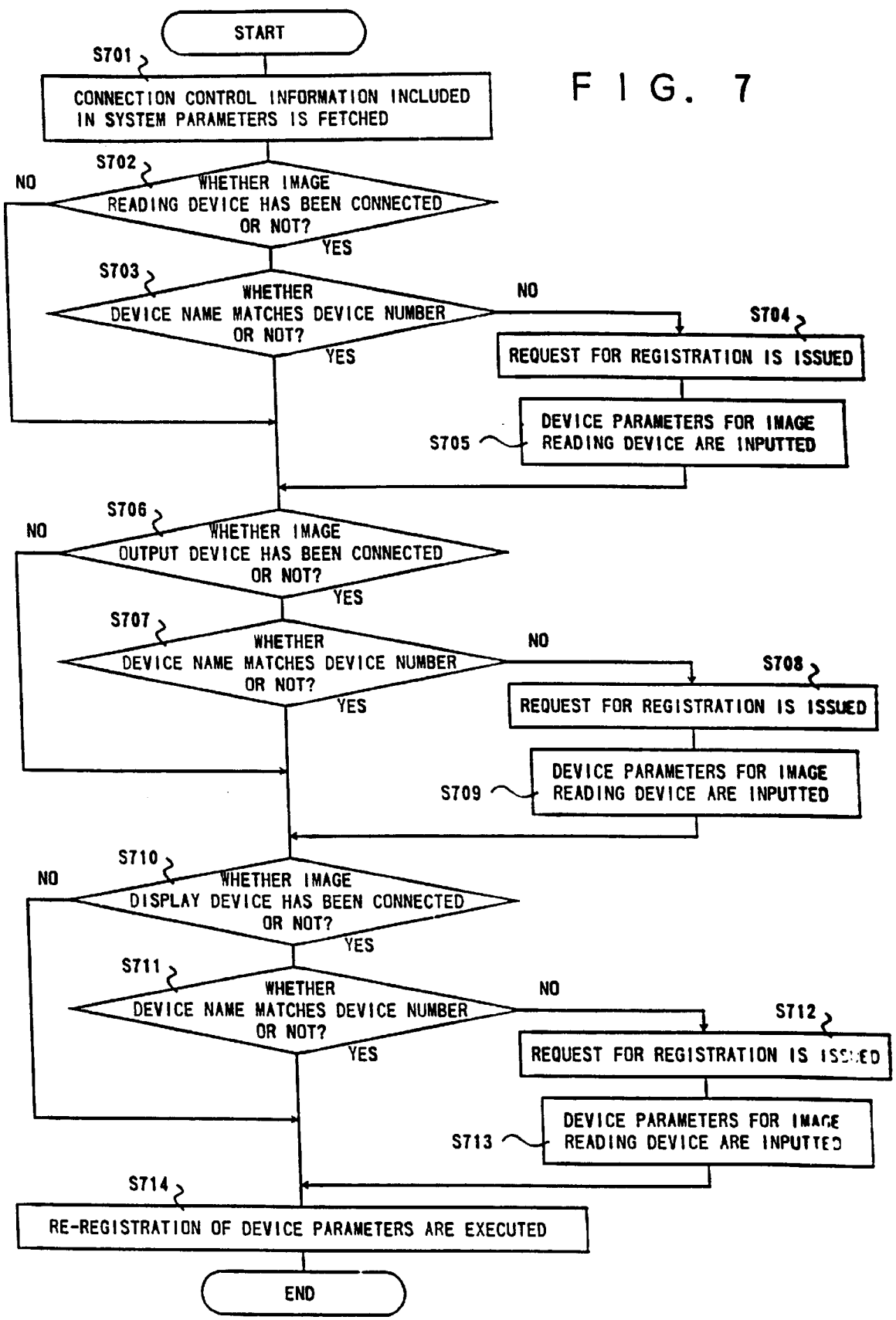
FIG. 7 is a flow chart for an operation for checking registration.

When timing for registration is decided through the operation for setting the timing shown in FIG. 6, registration is checked according to the flow chart shown in FIG. 7. At first, connection control data included in the system parameters is fetched (S701), and connection of each device is checked according to the connection control data.

Then whether the image reading device 101 has been connected or not is checked (S702), and if it is determined that the image reading device 101 has been connected, whether the device name matches the device number or not is checked (S703), and if the device name does not match the device number, a request for registration is issued (S704). This request for registration is alerted by, for instance, a display indicating an alarm or a prompt for registration. Then device parameters for the image reading device 101 are inputted through the operation/input device 105 (S705). Later on, the same operations are executed through the steps S706 to S709 to the image output device 102, and through the steps S710 to S713 to the image display device 103.

Then re-registration of device parameters are executed (S714) according to a result of operations in the steps S702 to S713, thus the processing being terminated.

Figure 8:
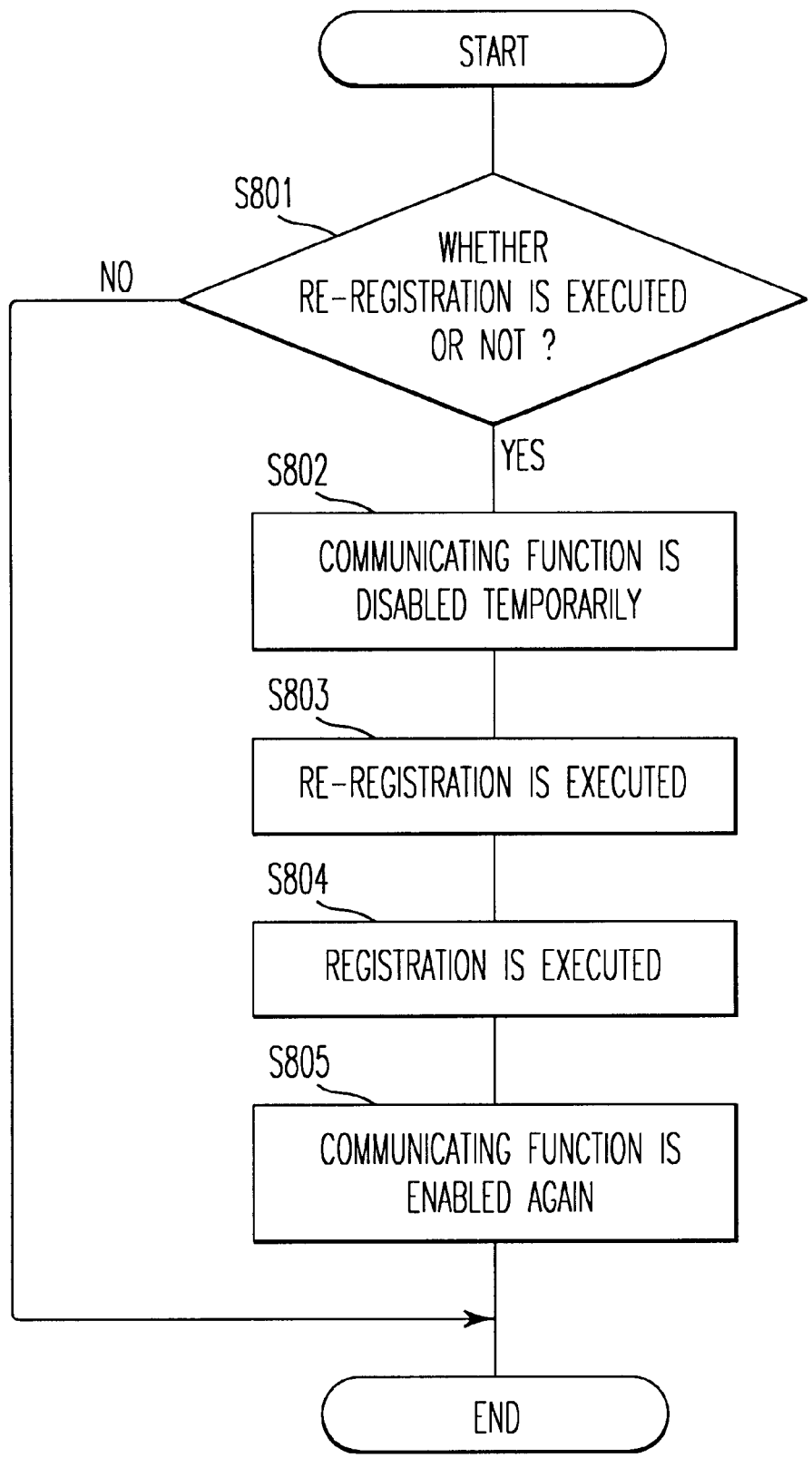
FIG. 8 is a flow chart for an operation for stopping data transaction.

It should be noted that, in this embodiment, if the processing for checking re-registration of device parameters has been executed in FIG. 7, the transacting function is stopped temporally. FIG. 8 shows a flow chart for an operation for stopping communication, in which whether re-registration should be executed or not is checked (S801), the communicating function is disabled temporarily (S802), if it is necessary to execute re-registration, an operation for checking re-registration in FIG. 7 is executed (S803), registration is executed (S804), and then the communication function is enabled again (S805). An operation for, for instance, changing system configuration can accurately be executed by rejecting communication during registration of system parameters for obtaining the best image.

FIG. 9 is an explanatory view illustrating a concrete example of a set of system parameters. The system parameters include data concerning characteristics of the device itself (connection control data) such as a device name, a device number, and capability thereof and various types of correction data for image processing in the device (device parameters). The device parameters include correction parameters and virtual device parameters, and the correction parameters include parameters for color correction, parameters for conversion, and table data for LUT. On the other hand, the virtual device parameters are those which can give a system which can simulate a color as if the color is outputted by the device itself in response to certain input.

By setting system parameters as described above, whether a given device has been connected or not can be checked accurately and automatically between devices according to a device name and a device number, and also a virtual system can be constructed by registering parameters specified to each device such as color correction parameters previously, according to these parameters.

Figure 10:
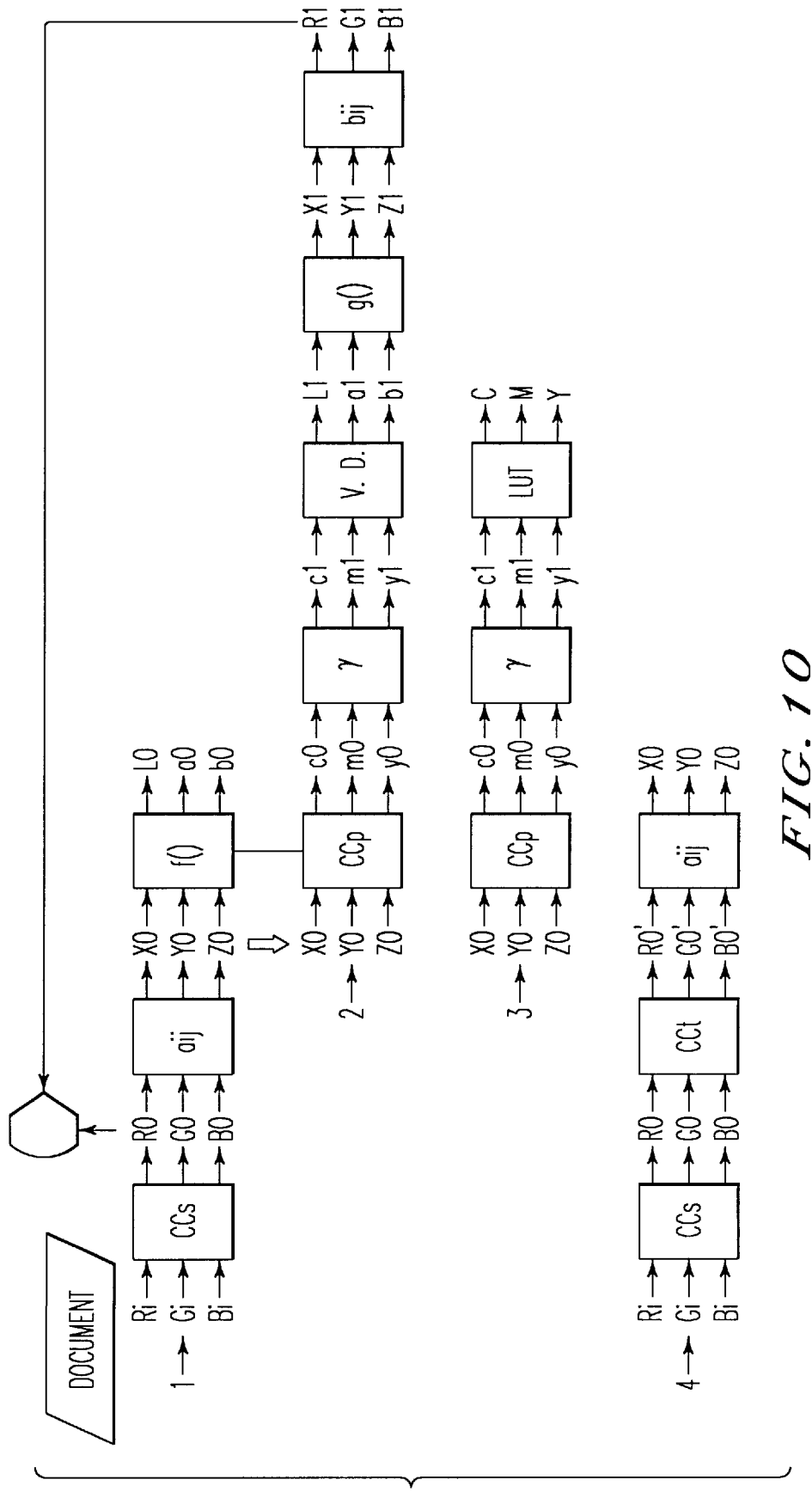
FIG. 10 is an explanatory view illustrating a method of executing best correction of image data by receiving system parameters assuming that recording paper is used in both the sending and receiving sides.

Then description is made for a method of correcting image data most suited to receiving system parameters as an example in which recording paper is used in both the sending and receiving sides with reference to FIG. 10. A system in the sending side receives system parameters for a system in the receiving side, constructs a virtual output system in the receiving side, executes color correction for a document, and executes transmission again. Thus the best image for the receiving side is formed in the sending side, only in which situation of the document can be known.

Sending side ①: Data Ri Gi Bi for a given document read by the image reading device 101 is converted to R0 G0 B0 after correction of read image CCs and is displayed on the image display device 103. The G0 G0 B0 data is converted to X0 Y0 Z0 through 3×3 matrix aij computing and is furthermore converted to L0 a0 b0 through the converting function f. Any numerical value to be used as standard may be employed as the matrix aij. The converting function f is a formula officially defined in relation to color processing as XYZ vs CIELAB conversion. As it is assumed that a standard signal for communication is XYZ, also it is assumed that a cut edge of each block is XYZ.

Sending side ②: System parameters from the receiving side are used to executed processing for the sending side ②. In this section, simulation of a virtual device can be executed. Device parameters sent from the receiving side is the data within the rectangular frame in ②. Contents of simulation concerning the receiving side to be executed in the sending side is described below. Generally the image data X0 Y0 Z0 to be transmitted is converted through correction CCp for the image output device 102 to a signal color reflection factor c0 m 0 y0 (herein it is assumed that the image output device 102 is a three-color system, but the same processing is possible also in a four-color system). To insure gray color in output of the data, γ correction is executed to the data to covert it to c1 m2 y1, thus L1 a1 b1 that would be outputted in the receiving side being obtained according to the parameter V.D. for realization of a virtual device. This result is converted to X1 Y1 Z1, contrary to ①, through the formula g known to people familiar with art, which is furthermore converted to R1 G1 B1 through the matrix bij which is reverse to aij and is displayed together with the R0 G0 B0 image on the image display device 103.

The correction parameter in the sending side to be obtained finally is executed between R0 G0 B0 and R1 G1 B1 so that the color difference ΔE=sqrt ((L0–L1)*(L0–L1)+(a0–a1)*(a0–a1)+(b0–b1)*(b0–b1)) between L0 a0 b0 in ① and L1 a1 b1 in ② will become minimum to calculate ④ CCt. When this color correction parameter CCt is obtained, then processing for sending an image is started.

Sending side ④: Processing including color correction parameter CCt corresponding to the receiving side computed as described above is added to ① to form X0 Y0 Z0.

Receiving side ③: Received data X0 Y0 Z0 is outputted with configuration to be outputted practically. The last LUT is table data for converting a signal color reflection factor to an output value from the image output device 102.

Figure 5:
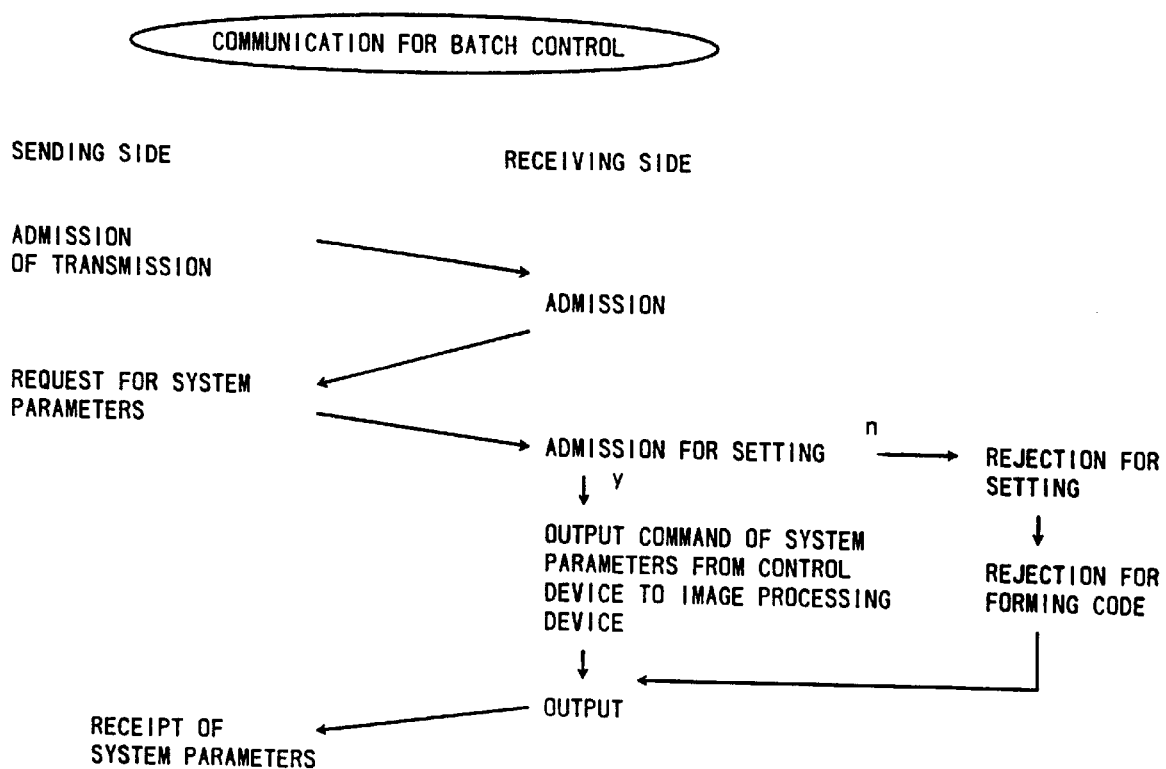
FIG. 5 is an explanatory view for explanation of processing when rejecting transmission of system parameters.
Figure 11:
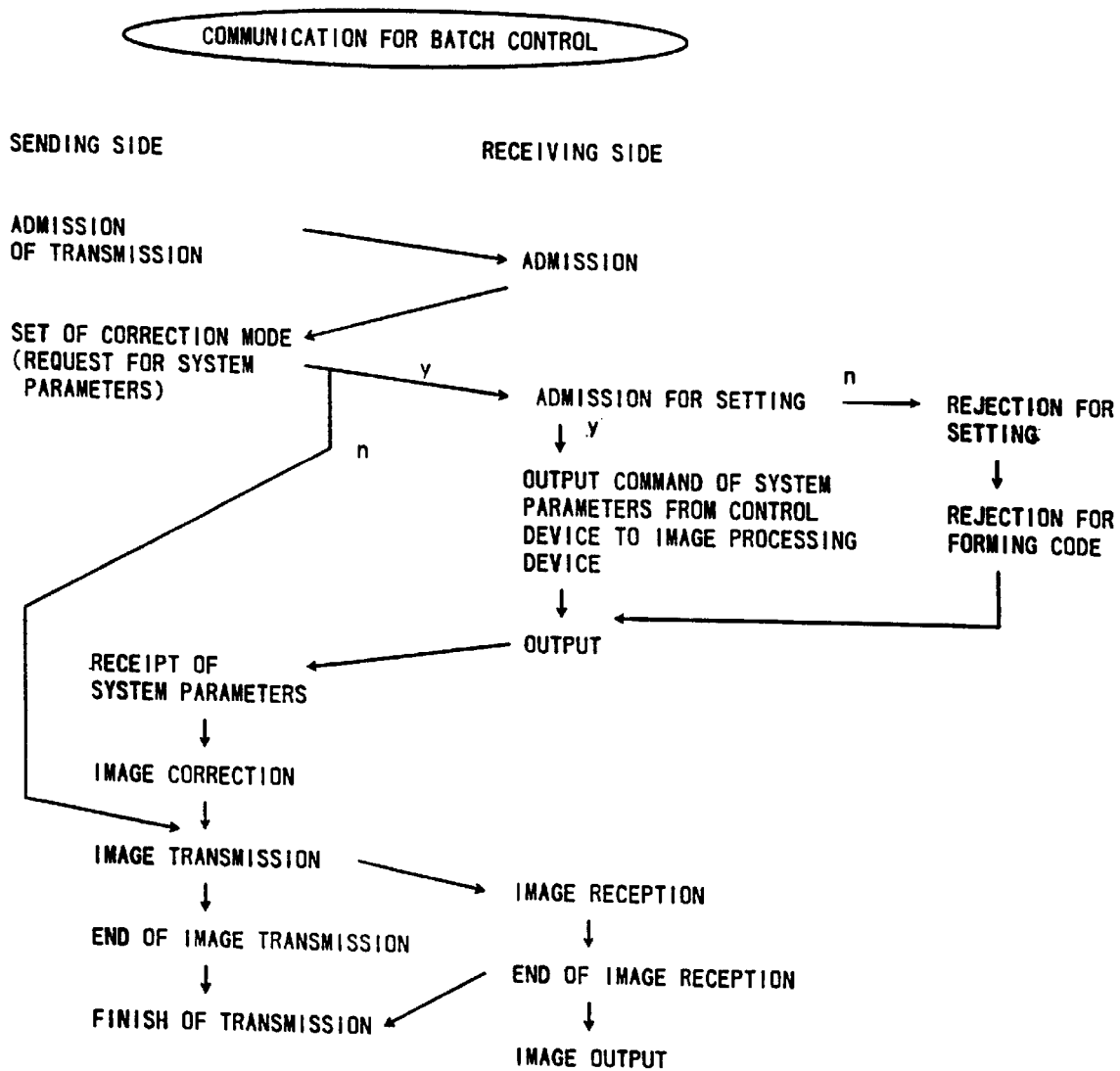
FIG. 11 is an explanatory view for explanation of an operation for switching between normal image communication and that based on system parameters in the sending side.

Next description is made of an example in which the sending side selects normal image communication or that according to system parameters (described correction mode hereinafter) between two systems each able to correspond to the correction method shown in FIG. 10. Description for FIG. 11 is made with reference to the batch control processing in FIG. 3. Also a flow up to the image communication omitted in FIGS. 3, 4, 5 is added herein. It should be noted that, when priority of correction mode to that of rejection code in the receiving side, the former is higher.

As shown in this figure, when the correction mode has been selected, the sending side outputs a request for system parameters to the receiving side, and if the correction mode has not been set, the sending side does not issue a request for system parameters, and executes processing for sending an image. By switching mode for sending in the sending side, an operation most suited to the current need such as that it is more important to know nuance of an image rather than to get a faithful reproduction of the image, or that anyhow it is necessary to get an image as soon as possible, can be selected.

Figure 12:
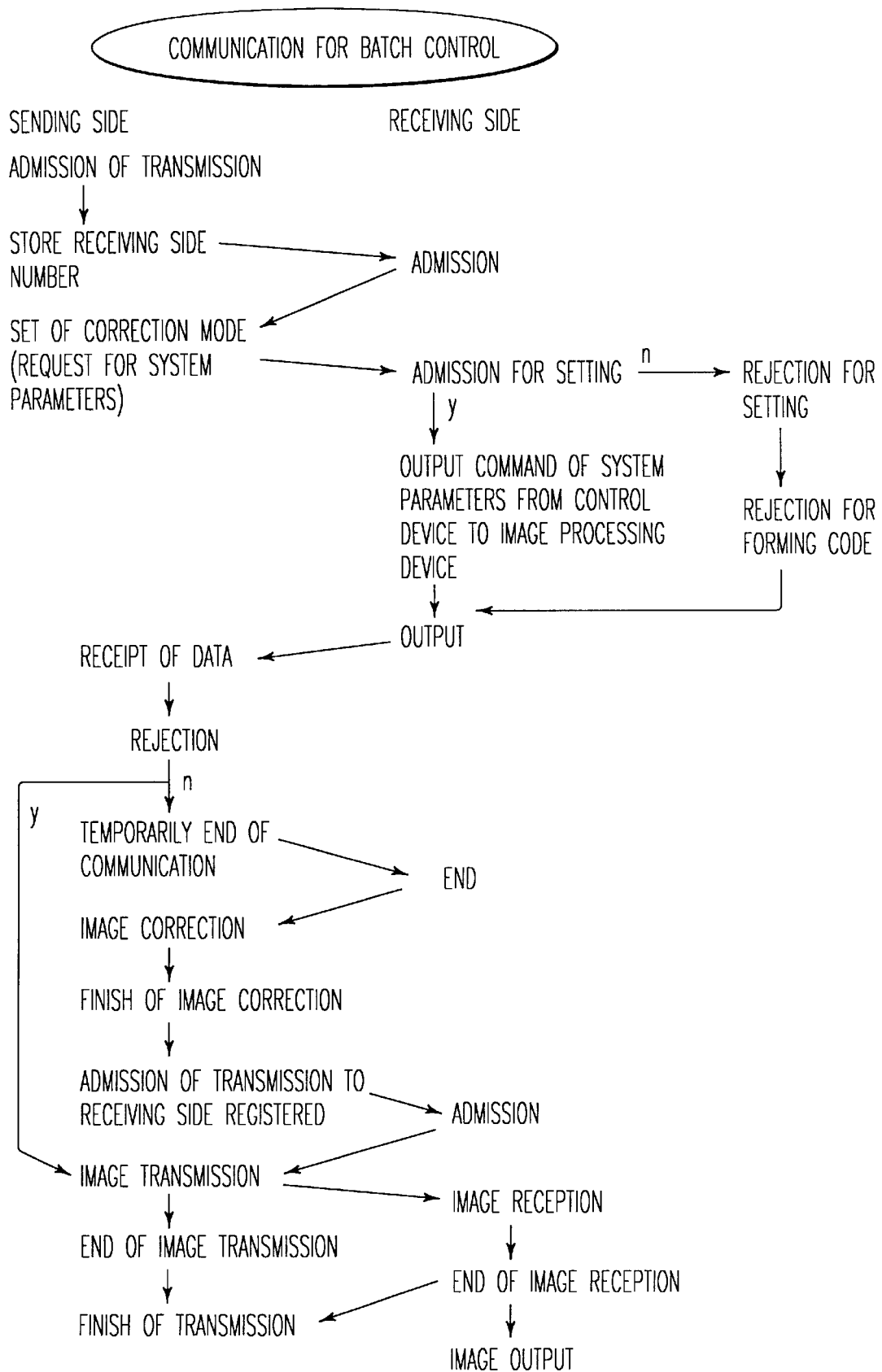
FIG. 12 is an explanatory view for explanation of a case in which pre-communication for delivery of parameter-related data is executed prior to start of image communication.

FIG. 12 shows a case where pre-communication for delivery of parameter-related data is executed prior to start of actual image communication. As shown in this figure, when pre-communication for delivery of parameter-related data is executed prior to start of actual image communication, the destination for communication in this step is stored. Then, the communication line is disconnected once, and after correction in the sending side to respond to the receiving side is complete, re-transmission to the stored destination for communication is started and the corrected image is transmitted. Execution of computing for correction after system parameters are received depends on capability of a processing section responsible for computing for correction. Therefore, sometimes a high speed processing capability may be available both in the sending and receiving sides, and also the reverse case may occur. In the cases as described above, if a communication line between the two systems is occupied for a long time, it is not desirable from a view point of asset utilization, and also the cost becomes expensive. For this reason, the communication line is disconnected once to eliminate waste during this period.

Figure 13:
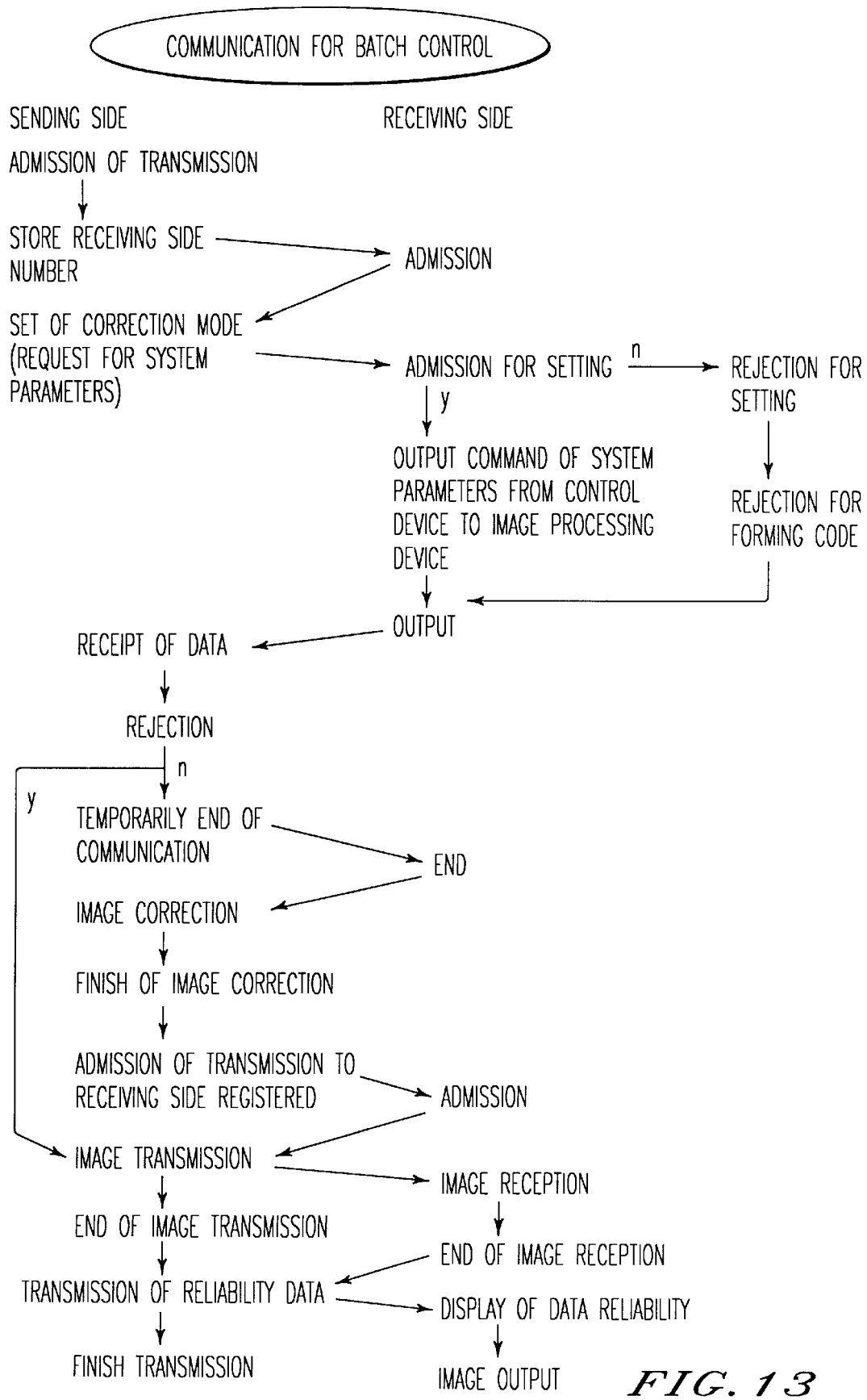
FIG. 13 is an explanatory view for explanation of an operation for sending also a color correction report such as an average color difference as a result of color correction together with a corrected image.

FIG. 13 shows a case where also a color correction report including an average color difference as a result of color correction is sent together with the corrected image is sent, and in this case a color correction report including an average color difference as a result of color correction is sent together with the corrected image, and the color correction report sent as described above is used as data concerning reliability of color correction for the corrected image in the receiving side. This data is added when the correction mode described above is set. This data enables the receiving side to numerically detect how faithfully the image is reproduced, and the result can be used as a reference for reliability of the corrected image.

As described above, the color digital image composing apparatus according to the present invention comprises a memory for storing therein system parameters consisting of data on connection between devices each constituting the color digital image composing apparatus having a facsimile function and system parameters specified to each device, a registration device for registering therein data on connection of devices each constituting the color digital image composing apparatus and parameters specific to each device as system parameters, and a controller for sending and receiving the system parameters stored in the memory prior to start of facsimile communication, so that image data most suited to the capability of the receiving side can be sent.

Also the color digital image composing apparatus according to the present invention comprises a memory for storing therein system parameters consisting of data on connection between devices each constituting the color digital image composing apparatus having a facsimile function and system parameters specified to each device, a registration device for registering therein data on connection of devices each constituting the color digital image composing apparatus and parameters specific to each device as system parameters, a rejection setting device for rejecting transmission of system parameters in response to a request for system parameters from the sending side, and a controller for selecting transmission of system parameters stored in the memory or notice of rejection code according to the contents set in the rejection setting device when a request for system parameters is issued from the sending side, so that image data most suited to capability of the receiving side can be transmitted. Also in cases where, for instance, configuration or characteristics of each device owned by the user, or product data from each manufacturer should be protected or can not be publicized because, for instance, the product is till under testing, data security for the receiving side can be insured.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color digital image composing apparatus having a facsimile function for transmitting and receiving data by facsimile from and to a destination, comprising:

a registration device for registering system parameters including data concerning connection between devices;

a memory for storing therein the system parameters including the data concerning connection between devices; and a controller for sending and receiving said system parameters stored in said memory prior to start of facsimile communication through a communication line, wherein said controller once disconnects the communication line to the destination after receiving system parameters from the destination, corrects an image to be sent to the destination based on the received system parameters, and then reconnects the communication line to send a corrected image to the destination from which the system parameters are received.

2. A color digital image composing apparatus according to claim 1, wherein said controller temporally disables the communication function when registration is executed through said registration device.

3. A color digital image composing apparatus according to claim 1, wherein said system parameters include at least data indicating characteristics of a device including a device name and a device number and color correction parameters.

4. A color digital image composing apparatus according to claim 1, wherein said controller executes, in addition to correction of the image to be sent to the destination, provision of numeral values generated through correction.

* * * * *